United States Patent
Kent et al.

(10) Patent No.: US 8,503,509 B2
(45) Date of Patent: Aug. 6, 2013

(54) METHOD AND SYSTEM FOR MANAGING, CONTROLLING, AND COMBINING SIGNALS IN A FREQUENCY SELECTIVE MULTIPATH FADING CHANNEL

(75) Inventors: Mark Kent, Vista, CA (US); Uri M. Landau, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/185,297

(22) Filed: Jul. 18, 2011

(65) Prior Publication Data

US 2011/0274144 A1 Nov. 10, 2011

Related U.S. Application Data

(63) Continuation of application No. 11/173,854, filed on Jun. 30, 2005, now Pat. No. 7,983,323.

(60) Provisional application No. 60/616,735, filed on Oct. 6, 2004.

(51) Int. Cl.
*H04B 1/00* (2006.01)

(52) U.S. Cl.
USPC ............................ 375/148; 375/349; 375/354

(58) Field of Classification Search
USPC ................. 375/140–145, 147–153, 260, 268, 375/316, 346, 349, 354, 371
See application file for complete search history.

(56) References Cited

U.S. PATENT DOCUMENTS

| | | | |
|---|---|---|---|
| 6,128,276 A | 10/2000 | Agee | |
| 6,327,534 B1 | 12/2001 | Levanon et al. | |
| 7,471,694 B2 | 12/2008 | Kent et al. | |
| 7,483,675 B2 | 1/2009 | Kent et al. | |
| 7,505,539 B2 | 3/2009 | Kent et al. | |
| 7,522,562 B2 | 4/2009 | Kent et al. | |
| 7,586,886 B2 | 9/2009 | Kent et al. | |
| 7,593,493 B2 | 9/2009 | Kent et al. | |
| 7,643,839 B2 | 1/2010 | Kent et al. | |
| 7,787,520 B2 | 8/2010 | Kent et al. | |
| 7,889,781 B2 | 2/2011 | Li et al. | |
| 7,894,507 B2 | 2/2011 | Kent et al. | |
| 7,983,323 B2 * | 7/2011 | Kent et al. | 375/148 |
| 7,991,361 B2 | 8/2011 | Kent et al. | |

(Continued)

OTHER PUBLICATIONS

U.S. Appl. No. 60/616,735 inventors Kent, M., et al., filed on Oct. 6, 2004.

*Primary Examiner* — Chieh M Fan
*Assistant Examiner* — James M Perez
(74) *Attorney, Agent, or Firm* — Sterne, Kessler, Goldstein & Fox PLLC

(57) ABSTRACT

A maximum signal energy level among a plurality of individual distinct path signals in a wirelessly received signal cluster is detected. An early aggregate power level associated with at least a portion of the plurality of individual distinct path signals received at time instants preceding a first moment time, and a late aggregate power level associated with at least a portion of the plurality of individual distinct path signals received at time instants subsequent to the first moment time are computed. The first moment time, which corresponds to the detected maximum signal energy level, is adjusted based on the early aggregate power level and the late aggregate power level. At least a portion of the plurality of individual distinct path signals is received at a corresponding plurality of time instants within a duration comprising a delay spread of the wirelessly received signal cluster based on the adjusted first moment time.

20 Claims, 10 Drawing Sheets

U.S. PATENT DOCUMENTS

| | | |
|---|---|---|
| 8,023,554 B2 | 9/2011 | Kent et al. |
| 8,098,683 B2 | 1/2012 | Kent et al. |
| 8,098,776 B2 | 1/2012 | Kent et al. |
| 8,111,789 B2 | 2/2012 | Kent et al. |
| 8,254,306 B2 | 8/2012 | Kent et al. |
| 8,340,139 B2 | 12/2012 | Kent et al. |
| 8,391,322 B2 | 3/2013 | Kent et al. |
| 2003/0031234 A1 | 2/2003 | Smee et al. |
| 2003/0161390 A1 | 8/2003 | Teague et al. |
| 2004/0139466 A1 | 7/2004 | Sharma et al. |
| 2005/0243898 A1 | 11/2005 | Reznik et al. |
| 2006/0072449 A1 | 4/2006 | Kent et al. |
| 2006/0072498 A1 | 4/2006 | Kent et al. |
| 2006/0072500 A1 | 4/2006 | Kent et al. |
| 2006/0083202 A1 | 4/2006 | Kent et al. |
| 2007/0015545 A1 | 1/2007 | Leifer et al. |
| 2007/0110130 A1* | 5/2007 | Kang et al. .................. 375/147 |

* cited by examiner

METHOD AND SYSTEM FOR MANAGING, CONTROLLING, AND COMBINING SIGNALS IN A FREQUENCY SELECTIVE MULTIPATH FADING CHANNEL

CROSS-REFERENCE TO RELATED APPLICATIONS

This application is a continuation of U.S. application Ser. No. 11/173,854, filed Jun. 30, 2005, now U.S. Pat. No. 7,983,323, which claims the benefit of U.S. Provisional Application Ser. No. 60/616,735, filed Oct. 6, 2004, both of which are hereby incorporated by reference in their entireties.

This application is related to the following applications, each of which is incorporated herein by reference in its entirety:

U.S application Ser. No. 11/173,870, filed Jun. 30, 2005;
U.S. application Ser. No. 11/174,303, filed Jun. 30, 2005, now U.S. Pat. No. 7,643,839;
U.S. application Ser. No. 11/173,502, filed Jun. 30, 2005;
U.S. application Ser. No. 11/173,871, filed Jun. 30, 2005, now U.S. Pat. No. 7,894,507;
U.S. application Ser. No. 11/173,964, filed Jun. 30, 2005, now U.S. Pat. No. 7,787,520;
U.S. application Ser. No. 11/173,252, filed Jun. 30, 2005, now U.S. Pat. No. 7,471,694;
U.S. application Ser. No. 11/174,252, filed Jun. 30, 2005, now U.S. Pat. No. 8,340,139;
U.S. application Ser. No. 11/172,756, filed Jun. 30, 2005, now U.S. Pat. No. 7,522,562;
U.S. application Ser. No. 11,173,305, filed Jun. 30, 2005, now U.S. Pat. No. 8,111,789;
U.S. application Ser. No. 11/172,759, filed Jun. 30, 2005, now U.S. Pat. No. 7,483,675;
U.S. application Ser. No. 11/173,689, filed Jun. 30, 2005;
U.S. application Ser. No. 11/173,304, filed Jun. 30, 2005, now U.S. Pat. No. 8,098,683;
U.S. application Ser. No. 11/173,129, filed Jun. 30, 2005, now U.S. Pat. No. 7,991,361;
U.S. application Ser. No. 11/172,779, filed Jun. 30, 2005, now U.S. Pat. No. 7,586,886;
U.S. application Ser. No. 11/172,702, filed Jun. 30, 2005, now U.S. Pat. No. 7,593,493;
U.S. application Serial No. 11/173,727, filed Jun. 30, 2005, now U.S. Pat. No. 8,098,776;
U.S. application Ser. No. 11/173,726, filed Jun. 30, 2005, now U.S. Pat. No. 8,254,306;
U.S. application Ser. No. 11/172,781, filed Jun. 30, 2005;
U.S. application Ser. No. 11/174,067, filed Jun. 30, 2005, now U.S. Pat. No. 8,391,322;
U.S. application Ser. No. 11/173,911, filed Jun. 30, 2005, now U.S. Pat. No. 8,023,554; and
U.S. application Ser. No. 11/174,403, filed Jun. 30, 2005.

FIELD OF THE INVENTION

Certain embodiments of the invention relate to communication receivers. More specifically, certain embodiments of the invention relate to a method and system for managing, controlling and combining signals in a frequency selective multipath fading channel.

BACKGROUND OF THE INVENTION

A wideband code division multiple access (W-CDMA) base transceiver station (BTS) may transmit a radio frequency (RF) signal, which may be reflected, and/or attenuated by various obstacles and surrounding objects while propagating though a transmission medium. Each of these reflections may comprise an individual distinct path, or path. As a result, a mobile receiver may receive a plurality of individual distinct versions of the transmitted signal, at a plurality of distinct time instants. Each of the received plurality of individual distinct versions of the transmitted signal may be associated with an individual distinct path and be referred to as an individual distinct path signal. A time instant associated with an individual distinct path signal, and a time instant associated with a subsequent individual distinct path signal may comprise a time offset. Various of the plurality of individual distinct path signals may be received at a received signal power level that may vary among the received plurality of individual distinct path signals. A time offset may vary among the received plurality of individual distinct path signals. For example, a time offset associated with an $n^{th}$ individual distinct path signal, and an $(n+1)^{th}$ individual distinct path signal, may differ from a time offset associated with an $m^{th}$ individual distinct path signal, and a $(m+1)^{th}$ individual distinct path signal, for $m \neq n$. A measure of a time offset may be referred to as temporal proximity.

The plurality of individual distinct path signals that may be received at the mobile receiver may be referred to as multipath signals, or a multipath. A medium through which a transmitted RF signal may be propagated is referred to as the RF channel, or a channel. Transmission impairments, or impairments, may be present in the channel that may introduce distortion, interference, and/or distortion as the transmitted RF signal propagates through the channel. The presence of transmission impairments may increase the difficulty of recovering a transmitted RF signal at a mobile receiver based on corresponding received multipath signals. The channel may be characterized by its RF bandwidth and whether the channel comprises a single path, or a multipath (selective fading channel). A channel that comprises a single path may be referred to as a flat fading channel. A channel that comprises a multipath may be referred to as a selective fading channel.

During reception of a multipath, and subsequent recovery of the corresponding transmitted RF signal, a multiplicative complex factor, comprising gain and RF phase, may be applied to an individual distinct path signal. The numerical values associated with the gain and RF phase may vary as the mobile receiver is moved from one location to another. The multipath signals may be characterized according to their energy levels. Each signal-path propagates different geometric distance that is manifested by a time duration that is the spread (of arrival time) of all relevant path-signals. This time duration may comprise a plurality of time instants during which a plurality of individual distinct path signals that constitute a multipath may be received at a mobile receiver. This time duration may also be referred to as a delay spread. During reception of a multipath at a mobile receiver, a profile for the measured signal path energy may an increase and decrease during a relatively short time period. This time period may be referred to as a path life time. Consequently, the transmission medium, through which a transmitted RF signal propagates, may be comprise time varying characteristics that influence the multipath that is received at the mobile receiver. The multipath may comprise a plurality of individual distinct path signals that may be received at a mobile receiver based on statistical properties.

A rake receiver may be utilized to recover an estimate of a transmitted RF signal based on received multipath signals. The rake receiver may implement a process that comprises generating an estimate for each received individual distinct path signal in the multipath. This generated estimate may be referred to as a channel estimate. A channel estimate that is generated based on an individual distinct path signal may be referred to as a path estimate. The process may further comprise descrambling the received multipath through application of a Gold code (GC). The GC may be applied to the received multipath at a time instant that is time synchronized to a reception, by the mobile receiver, of an individual distinct path signal. The descrambling may be referred to as correlating. Circuitry that performs the correlating may be referred to as a correlator.

The rake receiver may comprise a plurality of correlators, wherein an individual correlator may be time synchronized to a reception, by the mobile receiver, of an individual distinct path signal. The correlator may be referred to as performing time tracking on an individual distinct path signal. Following correlation a path estimate may be generated. The path estimate may be utilized to recover an estimate for at least a portion of the corresponding transmitted RF signal. Subsequently, the rake receiver may perform an operation on the received plurality of path estimates that comprises a time compensation, and combining.

Within the rake receiver, circuitry, referred to as a finger, may be assigned to process a received individual distinct path signal. The finger may perform the steps described above, during reception of the assigned received individual distinct path signal. A finger among a plurality of fingers in a rake receiver may be assigned to a corresponding one of a received plurality of individual distinct path signals that form component signals in a multipath. The output of the fingers may then be combined and further demodulated and decoded. The fingers may be implemented to receive and process as much of the received signal energy as practicable.

A considerable part of receiver design may involve managing the rake receiver fingers. A functional block known as a "searcher" may be adapted to locate new multipath signals and to allocate rake receiver fingers to the new multipath. The searcher may detect a path based on the amount of energy contained in a signal, identify that path if it carries user data, and subsequently monitor the detected path. Once the detected signal energy in a path is above a given threshold, a finger in the rake receiver may be assigned to the path and the signal energy level constantly monitored.

However, partitioning the received signal into several fingers, each of which may process and exploit energy in a single path, may have limitations. For example, a multipath may rarely be characterized by a distinct discrete time of arrival in connection with each received individual distinct path signal. As a result, the rake receiver may be inefficient at exploiting the power in received signals. In addition, utilizing this method may incur high processing overhead in managing the fingers. The total amount of time required to identify a path, assign a finger, and exploit the signal energy may account for 20-30% of the life span of a path. Once a finger is assigned to a path, detected energy on the path may be continuously monitored. However by the time the finger has been assigned, the path energy may be diminished, while energy may arrive at a different time. This may result in the rake receiver constantly searching for new paths, and performing finger de-allocation/allocation cycles. A finger that is allocated to a path with diminishing power may represent misused resources in the mobile terminal, which may in turn lower performance of the mobile terminal.

Another limitation in the conventional rake receiver is known as finger merge or 'fat' finger. This is a phenomenon in which paths are in close temporal proximity of each other. If a time difference between received individual distinct path signals is below some threshold value, more than one finger, among a plurality of fingers in a rake receiver, may be assigned to a common individual distinct path signal. Also, as a result of the close proximity, a bias may be introduced into the processing of the received multipath, whereby the two or more fingers track a single received individual distinct path signal. This fat finger phenomenon may result in negative implications for system performance.

The assignment of more than one finger to a received individual distinct path signal may be a waste of system resources, as the additional finger or fingers may be better deployed receiving additional energy from another received individual distinct path signal in the multipath, or receiving energy from a signal transmitted from another BTS. In addition, the combined power of the various fingers may often be used to control various system parameters, for example, power control. Without accounting for finger merge, a system may overestimate the received power due the duplication of energy detected in the combiner, and thus overcompensate by lowering transmit power to a threshold level below that required for adequate communication. Moreover, combining the output of merged fingers with the output of non-merged fingers may weight both the signal and noise of the merged finger output too heavily in relation to the non-merged finger output, which may result in inefficient exploitation of the received power.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for managing, controlling and combining signals in a frequency selective multipath fading channel, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for processing multipath clusters. Various embodiments of the invention describe a cluster path processor (CPP) that may process multipath signals wherein a temporal proximity between consecutive individual distinct path signals may be approximately equal across the multipath signals. The CPP may process multipath signals where channel estimation, and recovery of a corresponding transmitted RF signal is based on an estimate of an aggregate of at least a portion of the received individual distinct path signals contained in the multipath signals. The CPP may process a multipath based on at least a portion of a total signal energy level contained in the multipath that comprises an aggregate of signal energy from each of the constituent individual distinct path signals.

In various embodiments of the invention, the performance of the CPP in tracking and recovering RF signals may be less sensitive to fluctuations in temporal proximity and signal energy level that may be evidenced in a received individual distinct path signal. This CPP may facilitate novel and efficient methods for implementing processes such as assigning, tracking, measuring and reporting information (for example, energy and temporal location) based on statistical means as observed across a received signal cluster. This may eliminate the need for applying the same tasks, as may be performed by a rake receiver, on each of the received individual distinct path signals contained in the signal cluster. Various embodiments of the invention may include receiver designs that comprise a plurality of CPPs.

Figure 1:
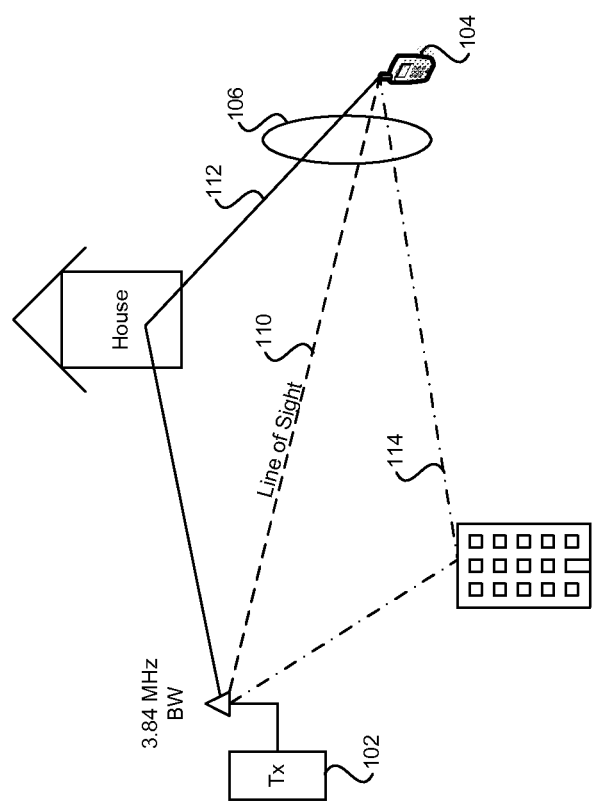
FIG. 1 is a diagram illustrating an exemplary multipath cluster that may be received by a mobile receiver, which may be utilized in connection with an embodiment of the invention.

FIG. 1 is a diagram illustrating an exemplary multipath cluster that may be received by a mobile receiver, which may be utilized in connection with an embodiment of the invention. With reference to FIG. 1 there is shown a transmitter 102, a mobile receiver 104, a multipath cluster 106, and a plurality of individual distinct path signals 110, 112, and 114. The plurality of individual distinct path signals 110, 112, and 114 may represent component signals in a multipath. The plurality of signals 110, 112 and 114, that may be received by the mobile receiver 104, may be referred to as a multipath cluster 106. The multipath cluster 106

With reference to FIG. 1, a transmitted radio frequency (RF) signal may be emitted by the transmitter 102, and subsequently form a multipath of individual path signals 110, 112 and 114, at a plurality of angles of departure (AODs) in relation to the transmitter 102. One of the plurality of AODs may correspond to an individual distinct path that is utilized by an individual distinct path signal 110, 112 and 114. The plurality of individual distinct path signals 110, 112 and 114 may arrive at the mobile receiver 104 at a plurality of angles of arrival (AOAs) in relation to the mobile receiver 104. Within the transmission medium between the transmitter 102 and mobile receiver 104, a transmitted RF signal may experience a coherent and direct line of sight path 110, as indicated by signal 110. The transmitted RF signal may be also experience reflections within the intervening communications medium that produces a plurality of individual distinct path signals, each of which may arrive at the mobile receiver 104 at a different AOA as indicated by signals 112 and 114.

The individual distinct path signals 110, 112 and 114, that comprise the multipath cluster 106, may arrive at the mobile receiver 104 at a plurality of time instants within a delay spread. An arrival time for a signals 110, 112, and 114 may vary depending upon the length of an individual distinct path utilized by the corresponding signal 110, 112, and 114. Thus, a plurality of individual distinct path signals, that utilize individual distinct paths comprising a similar path length between the transmitter 102 and the mobile receiver 104, may arrive at the mobile receiver 104 at a time that may be detectably distinct.

At the mobile receiver 104, from a time of arrival for a subsequent plurality of individual path length signals that utilize individual distinct paths comprising subsequent path lengths that are not similar to the before mentioned path lengths. Individual distinct path signals that utilize similar path lengths may be in temporal proximity. Individual distinct path signals that do not utilize similar path lengths may not be in temporal proximity.

In some conventional rake receiver designs, a plurality of fingers may be assigned to track a corresponding plurality of individual distinct path signals that are in temporal proximity, and may result in occurrence of the fat finger phenomenon.

In various embodiments of the invention, a single CPP may be assigned to track a group of signals comprising at least a portion of a plurality of individual distinct path signals that are in temporal plurality based on a computed aggregate signal energy level for at least a portion of a received signal cluster 106, and thereby reduce the likelihood of producing an instance of the fat finger phenomenon.

An $n^{th}$ individual distinct path signal, in a signal cluster, may arrive, at the mobile receiver 104, at a time T(n); n=0, L−1 where L is the number of distinct paths the CPP 208 can track. A value of the time T(n) may be measured relative to a time at the start of the corresponding delay spread that is associated with the receipt of the signal cluster. A plurality of individual distinct path signals that arrive at the mobile receiver 104 at a plurality of times T(n) may comprise the signal cluster, or cluster.

In some conventional rake receiver designs two distinct paths may be in temporal proximity of each one. If the value of their time difference is too small, for example, less than a value that corresponds to a reciprocal of a bandwidth that is associated with the channel, the fat finger phenomenon may occur in the rake receiver.

In one aspect of the invention, a first moment time, $T_{fm}$, may be computed. The first moment time $T_{fm}$ may represent a center time for the reception of the multipath cluster 106 at the mobile receiver 104. The center time may comprise a weighted average time for reception of signal energy over a duration of a delay spread. A value for the delay spread may be determined based on characteristics of a channel. In various embodiments of the invention, a value for the delay spread, $T_{ds}$, may be set in accordance with the characteristics of the channel. For example, if the first portion of a signal cluster 106 is received at the receiver at a time $t_{start}$, a last portion may be received at a time instant approximately described as $t_{start}+T_{ds}$. In an exemplary embodiment of the a time offset, $t_{off}$, may be determined to be:

$$t_{off} \cong \frac{T_{ds}}{L-1} \qquad \text{equation [1]}$$

where L may comprise a value that represents a number of CPP utilized in the CPP, for example, a value of 16.

A value for a time at which an $n^{th}$ individual distinct path signal is received, T(n), may be determined to be:

$$T(n) \cong t_{start} + (n-1)t_{off} \quad \text{equation[2]}$$

In relation to the first moment time $T_{fm}$, $t_{start}$ may be expressed as:

$$t_{start} \cong T_{fm} - m \cdot t_{off} \quad \text{equation[3]}$$

where the variable, m, may represent a number of time offsets subsequent to a start of a delay spread wherein the first moment time is located.

The value for T(n) may then be expressed in relation to the first moment time:

$$T(n) \cong T_{fm} + (n-m-1)t_{off} \quad \text{equation[4]}$$

As indicated in equation[4], given a first moment time, an offset, and a number of offsets subsequent to a start time for a delay spread, a time may be assigned to a plurality of fingers in a rake receiver, in accordance with an embodiment of the invention.

Determination of a detected energy level contained in a received signal cluster 106 may be based upon a time varying impulse response of an RF channel, h, which characterizes a transmission medium between the transmitter (for example, 102 in FIG. 1) and the mobile receiver (for example, 104 in FIG. 1). A relationship between a signal transmitted by a transmitter 102, x, and a signal received by a receiver 104, y, may be modeled:

$$y_k = \sum_{i=0}^{L-1} h_k(i) \cdot x(t_k - i \cdot t_{off}) + n_k \quad \text{equation [5]}$$

where i may be utilized to reference an individual distinct path signal within the received signal cluster, $h_k(i)$ may represent an $i^{th}$ individual distinct path signal within the received signal cluster, k may represent a time instant, $t_{off}$ may represent a time offset, $n_k$ may represent noise that may be added to the received signal cluster, and L may represent a number of individual distinct path signals that are resolvable within a multipath. The number of individual distinct path signals that are resolvable within a multipath may correspond to a number of the cluster element in a CPP in various embodiments of the invention.

The receiver 104 may compute an estimate, ĥ, of the time varying impulse response of the RF channel, h, based on the received signal, y, if the transmitter 102 transmits a known signal, contained within the transmitted signal x. This signal, which is contained within the transmitted signal x, may, for example, be referred to as a "pilot" signal, and may be utilized to compute estimates of the channel gain and RF phase across a delay spread of the channel. The computed estimate of the time varying impulse response ĥ, which may represent an estimate that characterizes the transmission medium, may be referred to as a "channel estimate". Based on the channel estimate, a detected energy level may be determined, based on the received signals in the cluster.

In various embodiments of the invention, as a mobile receiver 104, changes its position relative to the transmitter 102, arrival times during which individual distinct path signals are received within a signal cluster may also change. Changes in the arrival times may be tracked based on a computed aggregate signal energy level for at least a portion of the received signal cluster 106. As a result of the tracking, a time correction may be applied to the first moment time $T_{fm}$. The correction to the first moment time may result in a corresponding correction to the times T(n) that may be associated with individual cluster element in the CPP, as indicated in equation[4].

The plurality of cluster elements may be modeled as a grid comprising a plurality of temporal points, say L, which are a fixed $T_{BW}$ away from each other where $T_{BW}=1/BW$ is known as the chip time (spread-spectrum communication systems). The grid points represent L-hypotheses of L input streams which has one chip-time delay from its neighbor point. The correctness of each of the hypotheses is measured by the correlation value associated with the grid point. The correlation is performed between the input and a synthesized pilot signal (that maintains the timing hypothesis at each point by creating a delay version matching the hypothesis delay). The set of the correlators output represents the estimate to the channel response–h.

The span time instants, T(n), n=0, L–1 in the delay spread, wherein individual elements in the grid may be offset in time by a time increment that is approximately equal to the time offset $t_{off}$. Thus, as the arrival time of the signal cluster 106 changes at the receiver 104, the grid may shift in time correspondingly. As stated above, the CPP cluster grid points maintain equal fixed time distance between all the grid points. This distance may be a chip time or less. The time tracking, therefore, of signals of a multipath is accomplished by accelerating or de-accelerating the reference signal. The delayed reference signal and its delayed copies continuously correlate with the in coming signal. The combined features of tracking a cluster of signals with a fixed grid alleviates numerous disadvantages that are shown in the conventional rake receiver. For example: eliminating the "fat finger", the finger assigning/de-assigning cycle and a simplified energy and time reporting scheme based on the cluster as a whole.

The value of the time offset, $t_{off}$ may be defined to ensure that it encompasses an amount of time required by the transmitter 102 to transmit a bit or symbol. In W-CDMA transmission, an information signal, or "symbol", may be spread or scrambled prior to transmission by utilizing scrambling, or spreading codes such as, for example, Gold codes, or orthogonal variable spreading factor (OVSF) codes. The scrambling, or spreading code may transform the symbol into a series of signals known as "chips" which may be transmitted as a W-CDMA spread spectrum signal. The time offset, $t_{off}$ may be defined such that it encompasses the amount of time required to transmit the plurality of chips associated with a symbol. For example, if a transmitter 102 were to transmit chips at a "chip rate" of $3.84 \times 10^6$ chips/second, with each symbol comprising 16 chips, the time, Δt, may be defined to be equal to $(16/(3.84 \times 10^6))$ seconds, or approximately 4 microseconds.

In an exemplary embodiment of the invention, the receiver 104, a received signal may comprise a plurality of signal clusters. A plurality of signal clusters may originate from a single transmit antenna. The receiver 104 may be capable of receiving signals from a plurality of antennas. The plurality of antennas may be located at a single BTS, or dispersed among a plurality of BTSs. The receiver 104 may be adapted to track a time of arrival of multipath signals, and may enable an efficient combining of individual distinct path signals within the multipath signals, into a single output represented as a pair of a complex signals comprising an in-phase component (I) and a quadrature phase component (Q). The receiver 104 may generate a received signal comprising a plurality of individual distinct path signals within a signal cluster, and may reduce overhead associated with managing and processing a plurality of individual distinct path signals in a multipath when compared to some conventional rake receivers.

Figure 2:
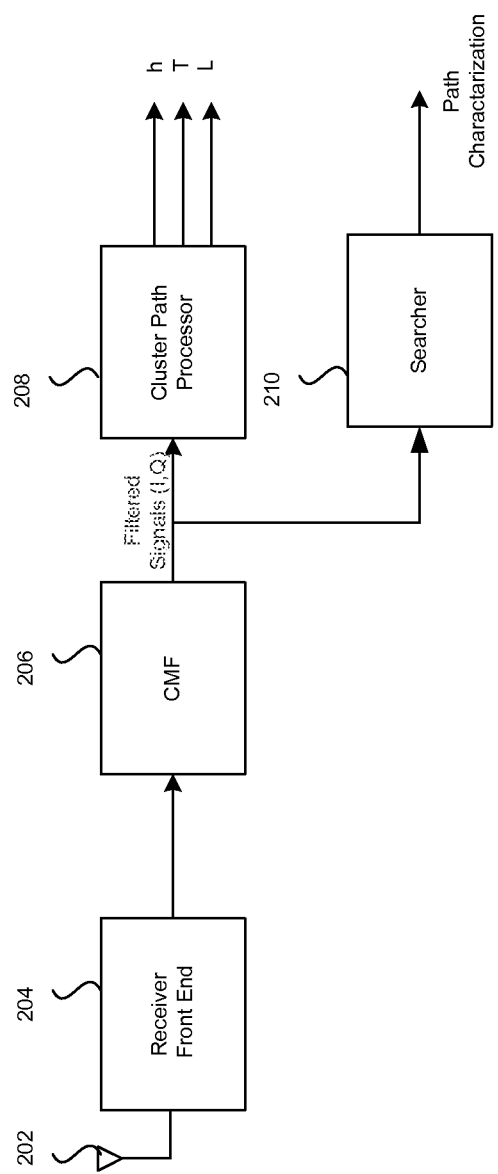
FIG. 2 is a block diagram illustrating an exemplary signal cluster preprocessor in a mobile receiver, in accordance with an embodiment of the invention.

FIG. 2 is a block diagram illustrating an exemplary signal cluster preprocessor in a mobile receiver, in accordance with an embodiment of the invention. Referring to FIG. 2, there is shown an antenna 202, a receiver front end block 204, a pair of chip matched filters (CMF) block 206, a cluster path processor (CPP) block 208, and a searcher block 210.

The antenna 202 may comprise suitable logic, circuitry, and/or code that may be adapted to receive RF signals. The receiver front end block 204 may comprise suitable logic, circuitry, and/or code that may be adapted to receive RF signals as input and process the RF signals to a baseband frequency. The baseband frequency may be sampled digitally at a pre-determined rate sufficient for the bandwidth of the channel, and the sampled data may be the output of the receiver front end block 204. The pair of chip matched filters block 206 may comprise suitable logic, circuitry, and/or code that may be adapted to digitally filter the I and Q components of the signal received from the receiver front end block 204 utilizing a process that is matched to a corresponding process utilized by the transmitter. Specifically, the match filter is a square root raised cosine type. The received signal may also be bandlimited to a bandwidth of interest.

The cluster path processor block 208 may comprise suitable logic, circuitry, and/or code that may be adapted to receive a digital signal and subsequently generate channel estimates comprising an amplitude and phase representation of the complex components I and Q of each channel estimate component. The cluster path processor block may also generate a timing reference signal based on the signal received from the CMF 206. An output signal from the CPP 208 may comprise channel estimates, and/or a timing reference signal.

The searcher block 210 may comprise suitable logic, circuitry and/or code that may be adapted to compute a first moment time $T_{fm}$, in a received signal cluster. The searcher 210 may detect a signal energy level that is associated with a plurality of received individual distinct path signals. The searcher 210 may identify an individual distinct path signal that comprises a maximum signal energy level within a received signal cluster, and compute a corresponding arrival time at which the signal may be received at the receiver 104. The arrival time of the individual distinct path signal that comprises the maximum signal energy may represent the first moment time $T_{fm}$. The searcher may compute a value, m, that represents a number of time offsets subsequent to a start of a delay spread wherein the first moment time is located. The searcher 210 may also generate a plurality of Gold code parameters that are utilized in applying Gold codes to received individual distinct path signals 110, 112 and 114.

In operation, the antenna 202 may receive RF signals, which may be communicated to the receiver front end block 204. The receiver front end block 204 may process received RF signals by filtering, amplifying, and down-converting the RF signal to baseband frequency. The down-converted signal may be digitally sampled by an analog-to-digital converter at a pre-determined sampling rate. The digitally sampled signal may be the output of the receiver front end block 204, and this signal may be communicated to the chip matched filter 206. The chip matched filter 206 may perform digital bandpass filtering on the baseband signal to limit the bandwidth of the signal received from the receiver front end 204. The bandlimited signal, comprising filtered signals I and Q, may be communicated to the searcher 210 and the cluster path processor 208. The searcher 210 may compute a first moment time, $T_{fm}$, based on the input filtered I and Q signals, a number of time offsets, m, and a plurality of Gold code parameters. The values computed by the searcher 210 may be communicated to the cluster path processor 208. The cluster path processor block 208 may utilize the first moment time, number of time offsets, and Gold code parameters, received from the searcher 210, to process the input filtered I and Q signal to generate output signals, which may be the complex phase and amplitude components of channel estimates that are computed, based on individual distinct path signals received at the antenna 202. The cluster path processor 208 may also generate timing reference signals. The generated channel estimate and timing signals may be outputs from the cluster path processor block 208 and may be utilized to combine the various individual distinct path signals that are components in a received signal cluster.

Figure 3A:
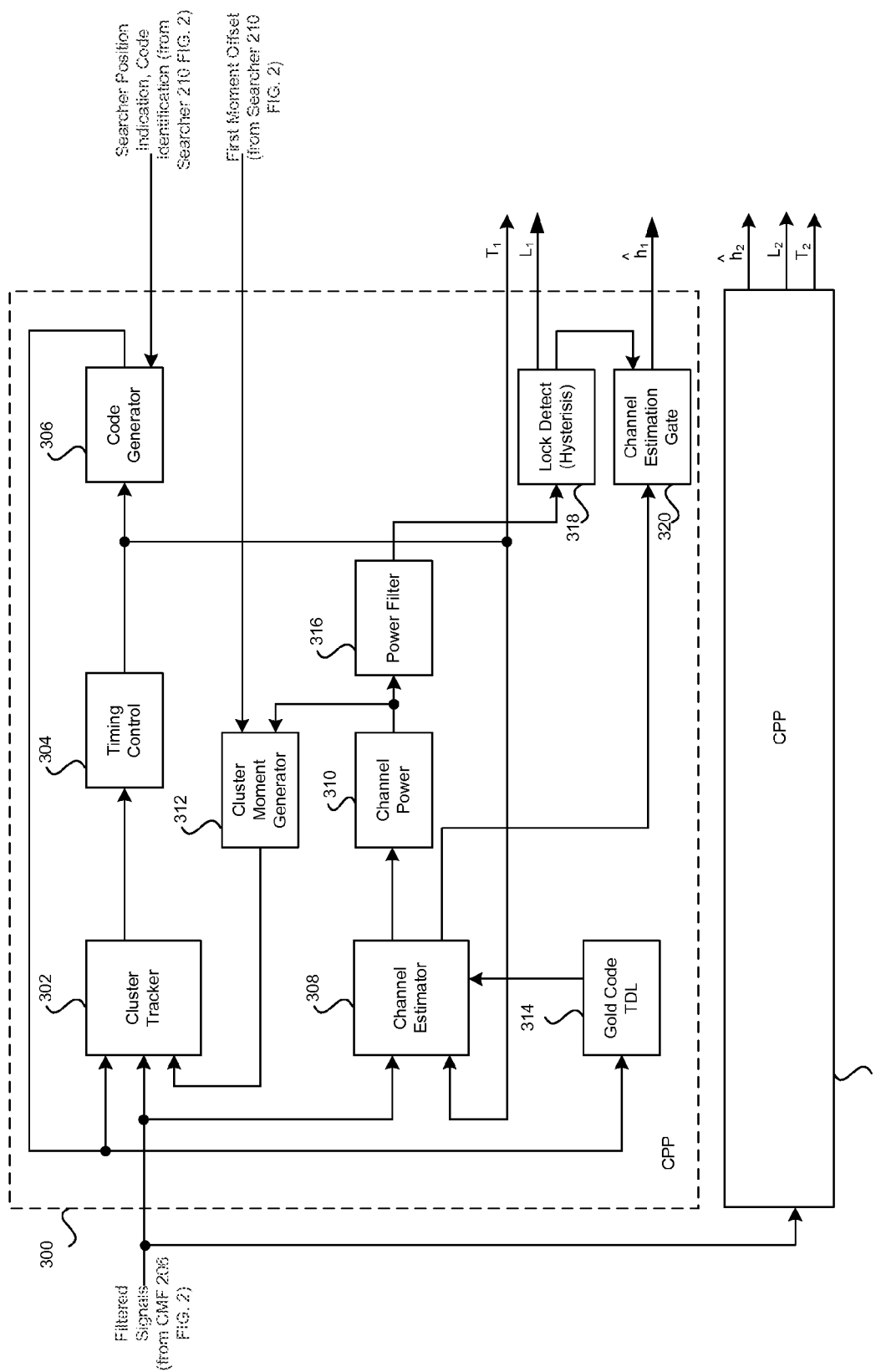
FIG. 3a is a block diagram of an exemplary cluster path processor (CPP), in accordance with an embodiment of the invention.

FIG. 3a is a block diagram of an exemplary cluster path processor (CPP), in accordance with an embodiment of the invention. Referring to FIG. 3a, there are shown the cluster path processors 300 and 350. The cluster path processor 300 may comprise a cluster tracker block 302, a timing control block 304, a local code generator block 306, a channel estimator block 308, a channel power block 310, a cluster moment generator block 312, and a Gold code TDL block 314. Input to the cluster path processor 300 may comprise the filtered signal from the chip matched filter 206 (FIG. 2), and first moment time, $T_{fm}$, first moment offset, m, and Gold code parameters from the searcher 210. The CPP 300 may output complex channel estimates $\hat{h}_1$, and a timing reference signal $T_1$, while the CPP 350 may output complex channel estimates $\hat{h}_2$, and a timing correction signal $T_2$.

Regarding the CPP 300, the cluster tracker block 302 may comprise suitable logic, circuitry, and/or code that may be adapted to track the location in time, or temporal location, of a received signal cluster. The cluster tracker block 302 may receive, as input, the filtered signal from the chip matched filter 206, a signal from the code generator 306, and a signal from the cluster moment generator 312. The filtered signal from the chip matched filter 206 may comprise a plurality of chips in a W-CDMA spread spectrum signal. The cluster tracker block 302 may utilize a descrambling code contained in the signal from the code generator 306 to perform descrambling on the filtered signal from the chip matched filter 206. The descrambling code may be applied to the filtered signal at a time, which may be based on a timing signal contained in an input signal from the cluster moment generator 312. The cluster tracker block 302 may generate a timing adjustment signal based on the result of the application of the descrambling code, from the code generator 306, to the filtered signal, wherein the application may be time-aligned based on the timing signal from the cluster moment generator 312. The generated output from the cluster tracker block 302 may be communicated to the timing control block 304.

The timing control block 304 may comprise suitable logic, circuitry, and/or code that may be adapted to monitor an arrival time of a signal cluster, and to generate a timing correction signal. The timing control block 304 may receive input, comprising a timing adjustment signal, from the cluster tracking block 302. Based on the input, the timing control block 304 may generate as output, a timing reference signal that indicates the temporal location of a received multipath signal. The timing reference signal generated by the timing control block 304 may be communicated to the code generator block 306 and to the channel estimator block 308. In addition, the timing reference signal may be an output from the cluster path processor 300 as the signal $T_1$.

The code generator block 306 may comprise suitable logic, circuitry, and/or code that may be adapted to generate time-aligned Gold codes, and/or orthogonal variable spreading factor (OVSF) codes, for example, serially at a defined rate. The code generator block 306 may receive input from the timing control block 304 that may be utilized to control a timing sequence in which Gold codes and/or OVSF codes are generated. The codes generated by the code generator block 306 may be communicated to the cluster tracker 302, and to the Gold Code TDL 314.

The channel estimator block 308 may comprise suitable logic, circuitry, and/or code that may be adapted to compute complex channel estimates comprising a representation of the complex components I and Q of each channel estimate component. The channel estimator block 308 may receive as input the filtered signal from the chip matched filter 206, and the timing signal from timing control block 304. In addition, the channel estimator block 308 may receive input from the Gold Code TDL 314. The channel estimator block 308 may utilize the descrambling, or despreading code from the Gold Code TDL 314, and the timing reference signal from the timing control block 304, to perform descrambling, or despreading on the filtered signal from the chip matched filter 206. The channel estimator block 308 may utilize the timing signal from the timing control block 304 to time-align the application of the descrambling code from the Gold Code TDL to the filtered spread spectrum signal from the chip matched filter 206. The descrambling operation may be identical to the correlation—mentioned before—that provides a metric that measure the validity of the timing of the Gold Code (WCDMA reference signal) at each of the cluster grid points. The metric may be identical to the channel response—h and the Gold Code is the reference signal transmitted. As a result of the descrambling process, the channel estimator block may extract pilot symbols contained within the received signal cluster. The channel estimator block 308 may then compute complex channel estimates, $\hat{h}_k(i)$, based on information contained in the pilot signals that are received across a duration comprising a delay spread.

In various embodiments of the invention, the received pilot signals, comprising individual distinct path signals in a signal cluster, may be processed utilizing a grid comprising grid elements that generate a plurality of channel estimates, $\hat{h}_k(i)$, as described in equation[5]. Stating more generally, the information (chip pattern) that is transmitted within pilot signals, x, may be known at the receiver 104, and since the corresponding values of the signals received at the receiver, y, may also be known at the receiver, the values of the channel estimates $\hat{h}_k(i)$ may be computed by correlating x with y; provided x is uncorrelated with other signals in y. The complex channel estimate $\hat{h}_1$, that is output from the CPP 300, may be represented as a vector that comprises at least a portion of a plurality of paths estimates $\hat{h}_k(i)$ computed in accordance with equation[5]. An individual path estimate $\hat{h}_k(i)$ may be computed for a corresponding grid element—i. In a grid that comprises L grid elements, at least a portion of a plurality of L channel estimates $\hat{h}_k(i)$ (i=0, L−1) may be contained in the vector representation $\hat{h}_1$. The complex channel estimate $\hat{h}_2$, that is output from the CPP 350, may correspondingly be represented as a vector that comprises at least a portion of a plurality of channel estimates $\hat{h}_k(i)$ computed in accordance with equation[5].

The channel power block 310 may comprise suitable logic, circuitry, and/or code that may be adapted to compute an aggregate radiated power level of the received signal cluster. The channel power block 310 may receive as input, channel estimates, $\hat{h}_k(i)$, from the channel estimator block 308. The channel power block 310 may utilize the received channel estimate, $\hat{h}_k(i)$, to compute a power level corresponding to each of the grid elements i. Thus, the channel power block 310 may compute a power level that corresponds to a received individual distinct path signal that is received at a time instant, T(n), wherein the received signal arrives at the receiver within a duration of a signal cluster. A time T(n) may be derived based on a received first moment time, $T_{fm}$, as described in equation[4]. For a given channel estimate that corresponds to an $i^{th}$ grid element, $\hat{h}_k(i)$, a channel power level may be based on a squared magnitude of the channel estimate and is computed:

$$\text{Power Level}[\hat{h}_k(i)] \cong \|\hat{h}_k(i)\|^2 \qquad \text{equation[6]}$$

The power filter block 316, may comprise suitable logic, circuitry and/or code that computes a plurality of average values, avg{power level[$\hat{h}_k(i)$]}, for a corresponding plurality of values, power level[$\hat{h}_k(i)$], measured over a duration that is long compared to the duration of a delay spread. For example, the power filter block 316 may average power levels, power level[$\hat{h}_k(i)$], over a duration of 10 milliseconds (ms).

Among the plurality of computed power levels, power level[$\hat{h}_k(i)$], the lock detect block 318, may apply a threshold function to the power levels that are computed by the average values generated by the power filter block 316. The threshold function may be utilized to generate a plurality of lock indicator signals, $I_k(i)$, which indicate whether average values, avg{power level[$\hat{h}_k(i)$]}, generated by the power filter block 316 are less than a determined approximate threshold power level. For example, given threshold power levels, $P_{thresh\_high}$ and $P_{thresh\_low}$, the lock indicator signals that may be output by the lock detect block 318 may be computed:

$$l_k(i) \cong \begin{cases} 1 & \text{for } \|\hat{h}_k(i)\|^2 \geq P_{thresh\_high} \\ 0 & \text{for } \|\hat{h}_k(i)\|^2 < P_{thresh\_high} \end{cases} \qquad \text{equation [7a]}$$

if at least one of a preceding plurality of power levels, power level[$\hat{h}_j(i)$], has a value that is less than $P_{thresh\_low}$, and not one of the preceding plurality has a value that is greater than or equal to $P_{thresh\_high}$.

The computed lock indicator signals that may be output by the lock detect block 318 may be computed:

$$l_k(i) \cong \begin{cases} 1 & \text{for } \|\hat{h}_k(i)\|^2 \geq P_{thresh\_low} \\ 0 & \text{for } \|\hat{h}_k(i)\|^2 < P_{thresh\_low} \end{cases} \qquad \text{equation [7b]}$$

if at least one of a preceding plurality of power levels, power level[$\hat{h}_j(i)$], has a value that is greater than or equal to $P_{thresh\_high}$, and not one of the preceding plurality has a value that is less than $P_{thresh\_low}$.

The plurality of lock indicator signals, $I_k(i)$, may be communicated, by the lock detect block 318, to the channel estimation gate block 320. The plurality of lock indicator signals, $I_k(i)$, may be also communicated as outputs from the CPP 300.

The channel gate block 320 may comprise suitable logic, circuitry, and/or code to select, from a received plurality of channel estimates, $\hat{h}_k(i)$, at least a portion of the received plurality that comprise values that are determined to be valid based on a corresponding received plurality of lock indicator signals $I_k(i)$. The channel gate block 320 may generate a channel estimate vector, $\hat{h}_1$, comprising a plurality output channel estimates, output[$\hat{h}_k(i)$], according to:

$$\text{Output}[\hat{h}_k(i)] \cong \begin{cases} \hat{h}_k(i) & \text{for } l_k(i) = 1 \\ 0 & \text{for } l_k(i) = 0 \end{cases} \qquad \text{equation [8]}$$

where the channel estimate vector, $\hat{h}_1$, comprises a plurality of values output[$\hat{h}_k(i)$], and k comprises a range of values from 0 to L−1 corresponding to each of the plurality of grid elements spanning a delay spread in the received signal cluster.

The cluster moment generator block 312 may comprise suitable logic, circuitry, and/or code that may be adapted to perform a first moment calculation based on a received plurality of computed power levels, power level[$\hat{h}_k(i)$] from the channel power block 310, and a first moment offset, m, from the searcher 210. Based on this information, the cluster moment generator 312 may compute an aggregate power level for at least a portion of the received signal cluster that comprises individual distinct path signals measured at time instants T(n) for n<m, Pwr_$E_k$. The cluster moment generator 312 may compute a subsequent aggregate power level for at least a portion of the received signal cluster that comprises distinct path signals measured at time instants T(n) for n>m, Pwr_$L_k$. The aggregate power levels, Pwr_$E_k$ and Pwr_$L_k$, may be communicated to the cluster tracker block 302.

The Gold Code TDL block 314 may comprise suitable logic, circuitry, and/or code that may delay the application of descrambling and/or dispreading codes, for example, Gold codes and OVSF codes. The Gold Code TDL block 314 may receive as input, descrambling codes generated by the code generator block 306. The Gold Code TDL 314 may utilize a code tracking loop to regenerate the received scrambling codes for each of the time instants T(n) that span the delay spread associated with the received signal cluster. A corresponding grid of scrambling code elements 0, . . . , L−1 may be communicated to the channel estimator block 308.

In operation, filtered W-CDMA spread spectrum signals from the chip matched filter 206 containing a plurality of pilot signals from multiple base transceiver stations, may be communicated to an input of a plurality of cluster processor blocks within 208. Since information communicated in the transmitted pilot signals sent from the multiple BTS is the same, each BTS may scramble the pilot signal utilizing a unique Gold code. The cluster tracker block 302 may also receive as inputs an output generated by the code generator block 306, and an output generated by the cluster moment generator block 312. The input to the cluster tracker 302 from the code generator block 306 may comprise a descrambling code that was generated based on timing information derived from a previously received individual distinct path signal. The input from the cluster moment generator block 312 may comprise an error signal that was computed in accordance with equation[9]. The cluster tracker block 302 may utilize the input from the code generator block 306 to descramble the filtered signal from the chip matched filter 206. The descrambling code received from the code generator block 306 may be applied to the filtered signal from the chip matched filter 206 at a time instant based on the error signal received from the cluster moment generator block 312.

The cluster tracker block 302 may generate an error signal, error$_k$, based on a difference between aggregate power levels received from the cluster moment generator block 312:

$$\text{Error}_k \cong \sum_{i=0}^{m-1} \left\|\hat{h}_k(i)\right\|^2 - \sum_{i=m+1}^{L-1} \left\|\hat{h}_k(i)\right\|^2 \quad \text{equation [9]}$$

where L may represent the number of grid elements that is contained within a delay spread for the received signal cluster. The first term on the right hand side of equation[9] may represent the aggregate power level, Pwr_$E_k$, that was computed by the cluster moment generator 312. The second term on the right hand side of equation[9] may represent the aggregate power level, Pwr_$L_k$, that was computed by the cluster moment generator 312.

In operation, a current computed error signal, error$_k$, computed for a current signal cluster at a current time instant, k, may differ in value in comparison to a corresponding subsequent computed error signal, error$_p$, computed for a subsequent signal cluster at a subsequent time instant, p.

The cluster tracker 302 may perform an averaging of a plurality of computed error signals, error$_k$, over a duration that is long compared to the duration of a delay spread, 10 ms, for example. An averaged error signal, avg(error$_k$), may represent a weighted average error signal based on a current computed error signal, error$_k$, and a plurality of preceding computed error signals, error$_q$, where q is not equal to k. The averaged error signal value may be thresholded, and the averaged error signal value may be utilized to generate a timing adjustment signal. If a magnitude of the averaged error signal value is less than a threshold value, $T_{adj}$, the timing adjustment signal may be set to a value of 0. For magnitudes of the averaged error signal value that are greater than $T_{adj}$ the timing adjustment signal may be set to a value in accordance with receiver timing resolution, and sign of accumulated error signal error$_k$.

The averaging of error signals, error$_k$, computed by the cluster tracker 302 may isolate changes in individual error signals, error$_k$, from temporary changes in the timing adjustment signal that is generated by the cluster tracker 302. In turn, this may enhance the stability of time tracking of received signal clusters in various embodiments of the invention. To further enhance the stability of operation in various embodiments of the invention, the magnitude of the averaged error signal value, avg(error$_k$), may be thresholded to avoid generation of timing correction signals for averaged error signal values that are too small, for example a summation value that is less than a chip time. The timing adjustment signal may be communicated to the timing control block 304.

The timing control block 304 may utilize the timing adjustment signal from the cluster tracker block 302 to generate a set of timing reference signals $T_1$, which may represent, for example, be a locally generated code boundary or period. This timing reference signal may also be communicated to the code generator block 306, and to the channel estimator block 308. In addition, the timing reference signal may be an output from the cluster path processor 300 as the set of signals $T_1$.

A time corrected first moment time, $T'_{fm}$, may be generated by the timing control block 304 that represents a time correction of the first moment time, $T_{fm}$, that was received from the searcher 210. The time corrected first moment time, $T'_{fm}$, may be expressed:

$$T'_{fm} \cong T_{fm} - \text{Error} \quad \text{equation[10]}$$

where the error term is based on the timing adjustment signal received from the cluster tracker 302.

If the received first moment time, $T_{fm}$, represents a time instant corresponding to a center time for signal energy in the received signal cluster, the error term may be approximately equal to 0. Thus, the time corrected first moment time, $T'_{fm}$, as computed based on equation[10], may be approximately equal to the first moment time, $T_{fm}$, that was received from the searcher 210. The grid, in this case, may be in proper time alignment to track the received signal cluster and values of T(n) that correspond to time instants associated with each grid element may be computed in accordance with equation [4].

If the first moment time represents a time instant that occurs before the center time for signal energy in the received signal cluster, the error term, as computed in accordance with equation[9], may comprise a numerical value that is less than 0. In the case of a negative error term, the time corrected first moment time, $T'_{fm}$, as computed in accordance with equation [10], may comprise a value that is greater than the value of the first moment time, $T_{fm}$, that was received from the searcher 210. The grid, in this case, may not be in proper time alignment to track the received signal cluster. Accordingly, values of T(n) that correspond to time instants associated with each grid element may be computed in accordance with equation [11]:

$$T(n) \approx T'_{fm} + (n-m-1)t_{off} \qquad \text{equation[11]}$$

If the first moment time represents a time instant that occurs after the center time for signal energy in the received signal cluster, the error term, as computed in accordance with equation[9], may comprise a numerical value that is greater than 0. In the case of a positive error term, the time corrected first moment time, $T'_{fm}$, as computed in accordance with equation[10], may comprise a value that is less than the value of the first moment time, $T_{fm}$, that was received from the searcher 210. The grid, in this case, may not be in proper time alignment to track the received signal cluster and values of T(n) that correspond to time instants associated with each grid element may be computed in accordance with equation [11].

The timing control block 304 may perform averaging of a plurality of received timing adjustment signals. The averaging of the timing adjustment signals may isolate changes in the timing reference signals, $T_1$, from temporary changes in the timing adjustment signal that is received from the cluster tracker 302. In turn, this may enhance the stability of time tracking of received signal clusters in various embodiments of the invention.

The code generator block 306 may receive the timing reference signals, $T_1$, from the timing control block 304. Based on the timing signal, $T_1$, the code generator 306 may serially generate descrambling Gold codes and/or despreading OVSF codes. The code generator block 306 may receive inputs from the searcher 210 comprising a searcher position indication, and a code identification. The searcher position identification may comprise information that indicates to the code generator 306 a start time, $t_{start}$, indicating a time instant for the arrival of the first individual distinct path signal in a received signal cluster. The code identification may comprise information that may be utilized by the code generator block 306 to determine a code sequence to generate. The code sequences, also referred to as codes, generated by the code generator block 306 may be communicated to the cluster tracker block 302 and to the Gold Code TDL block 314.

The Gold Code TDL block 314 may receive as an input the Gold codes output by the code generator block 306. The Gold Code TDL block 314 may delay these codes such that the application of the despreading code on a chip at the receiver may be in precise time-alignment with the application of the spreading code on the corresponding symbol at the transmitter. The time-aligned despreading codes may be output from the Gold Code TDL communicated to the channel estimator block 308.

The timing reference signals, $T_1$, from the timing control block 304 may comprise a timing reference that is utilized for subsequent processing in a mobile receiver, for example, processing based on maximum ratio combining (MRC), or dispreading. The Gold Code TDL block 314 may further refine this estimate to generate a time-aligned version of the Gold code that may be accurate to within approximately 1 chip time unit of a true value of the first moment time, $T_{fm}$, for the received signal cluster.

In operation, a current computed power level[$\hat{h}_k(i)$] associated with an individual distinct path signal in a current signal cluster at a current time instant, k, may differ in value in comparison to a corresponding subsequent computed power level[$\hat{h}_p(i)$] associated with an individual distinct path signal in a subsequent signal cluster at a subsequent time instant, p.

The averaging performed by the power filter block 316 may enable the CPP 300 to isolate changes in the values of output channel estimates, $\hat{h}_1$, from temporary fluctuations in channel estimate values, $\hat{h}_k(i)$, that are detected within the CPP 300. Consequently, various embodiments of the invention may enable the implementation of rake receiver designs that achieve stable performance level over a plurality of received signal clusters.

The plurality of lock indicator signals, $I_k(i)$, generated by the lock detect block 318 may be utilized to determine if the corresponding channel estimate $\hat{h}_k(i)$ comprises a value that is valid. If one of the plurality of lock indicator signals, $I_k(i)$, is equal to 1, the corresponding channel estimate value, $\hat{h}_k(i)$, may comprise a valid value. If one of the plurality of lock indicator signals, $I_k(i)$, is equal to 0, the corresponding channel estimate value, $\hat{h}_k(i)$, may not comprise a valid value. Values of $\hat{h}_k(i)$ that are invalid may be discarded.

Similarly, the cluster path processor, 350, may receive as input the filtered data from the chip matched filter 206, and may generate as outputs channel estimates, $\hat{h}_2$, and a timing correction signals, $T_2$. The cluster path processor 350 may be adapted to receiving individual distinct path signals which are transmitted by a separate antenna from the antenna utilized to transmit individual distinct path signals that are received by the processor 300.

In various embodiments of the invention, the cluster path processor 300 may correct timing errors wherein a signal cluster is not received in accordance with a received first moment time by computing an error term, in accordance with equation[9]. The error term may be utilized to apply a time correction to the received first moment time, and to subsequently generate a time corrected first moment time. A grid, comprising a plurality of grid elements, each comprising a correlator, that process a received plurality of individual distinct path signals at time instants, T(n) computed in accordance with equation[4], may be shifted in time to track the received signal cluster based on an error term computed in accordance with equation[9]. The time tracking for the received signal cluster may be achieved based on a single first moment time, or time corrected first moment time. In some conventional rake receiver, time tracking of a plurality of L individual distinct path signals may comprise a corresponding plurality of L independent time tracking decisions. In various embodiments of the invention, time tracking of a plurality of L individual distinct path signals may comprise a single time tracking decision based on either a first moment time, or a time corrected first moment time. The first moment time, or the time corrected first moment time, may be computed based on an aggregate signal energy level as measured across a duration comprising the delay spread of a received signal cluster.

Figure 3B:
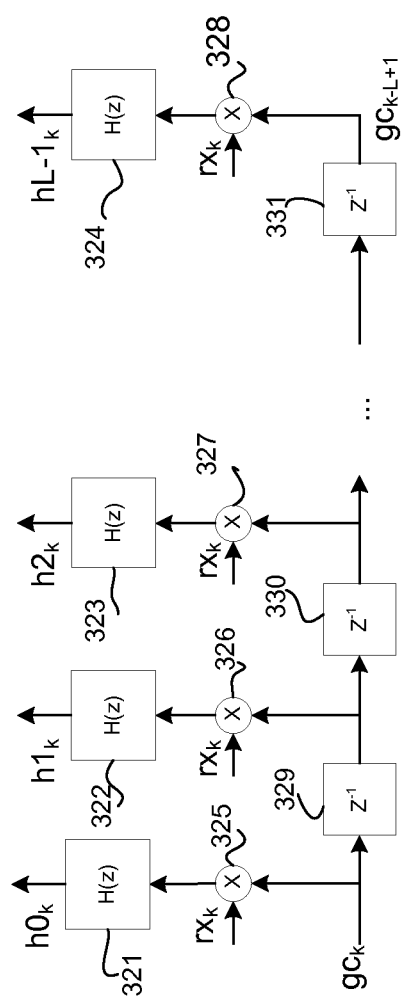
FIG. 3b is a block diagram of an exemplary channel estimation operation—in the CPP, in accordance with an embodiment of the invention.

FIG. 3b is a block diagram of an exemplary channel estimation operation in the CPP, in accordance with an embodiment of the invention. With reference to FIG. 3b there is shown a plurality of filter blocks 321, 322, 323, . . . , 324, a plurality of complex multiplication blocks 325, 326, 327, . . . , 328, and a plurality of delay blocks 329, 330, . . . , 331. The delay blocks 329, 330, . . . , 331, may comprise suitable logic, circuitry and/or code that may be adapted to store a time delayed version of a received input signal. The complex multiplication blocks 325, 326, 327, . . . , 328, may comprise suitable logic, circuitry and/or code to perform a convolution based on received input signals. The filter blocks 321, 322, 323, . . . , 324, may comprise suitable logic, circuitry and/or code to compute a channel estimate based on a received input signal.

In operation, a locally generated code, $gc_k$, for example Gold codes may be generated in association with a grid comprising a corresponding plurality of L grid elements that span a delay spread, achieved by a plurality of delay blocks. At a time instant, a current code, and preceding L−1 previously generated codes are utilized by a corresponding complex multiplication blocks 325, 326, 327, . . . , 328. The convolver blocks 325, 326, 327, . . . , 328 may perform a convolution utilizing a corresponding current and/or time delayed code, and a received signal cluster $rx_k$. The received signal cluster may be received from a chip matched filter 206. The convolution performed by the complex multiplication blocks 325, 326, 327, . . . , 328 may produce a plurality of descrambled and/or despread signals. The filter blocks 321, 322, 323, . . . , 324 may compute corresponding channel estimates, $\hat{h}_k(i)$, across the grid utilizing a corresponding plurality of descrambled and/or despread signals.

Figure 3C:
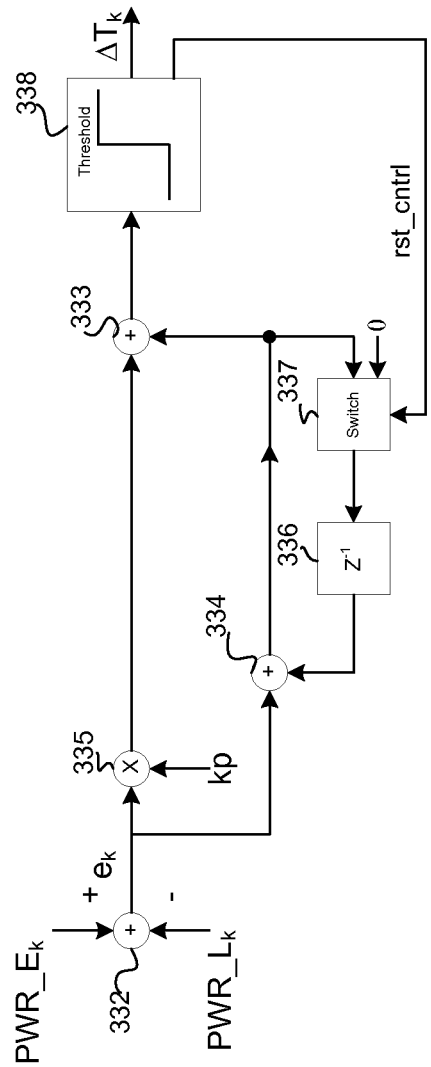
FIG. 3c is a block diagram of an exemplary cluster tracker operation, in accordance with an embodiment of the invention.

FIG. 3c is a block diagram of an exemplary cluster tracker operation, in accordance with an embodiment of the invention. With reference to FIG. 3c there is shown a plurality of summing blocks 332,333,334, a multiplier block 335, a delay block 336, a switching block 337, and a threshold block 338. The summing blocks 332,333,334 may comprise suitable logic, circuitry and/or code to generate an output signal based on a sum of received input signals. The multiplier block 335 may comprise suitable logic, circuitry and/or code that may generate an output signal that comprises a version of an input signal that is scaled according to an input scale factor. The delay block 336 is as described for the plurality of delay blocks 329, 330, . . . , 331. The switching block 337 may comprise suitable logic, circuitry and/or code that may generate an output signal that comprises a selected one of a plurality of input signals based on a selector input signal. The threshold block 338 may comprise suitable logic, circuitry and/or code that may compare a value of an input signal to a threshold value. An output signal may be generated based on the comparison.

In operation the summing block 332 may receive computed aggregate power levels, $Pwr\_E_k$ and $Pwr\_L_k$. The summing block 332 may compute a sum that comprises an error value $e_k$. The error signal may be driven to zero by providing timing adjustments to the grid position to ensure that statistical average is approximately equal to 0. The mechanism utilized in this operation may comprise a closed loop, in which timing adjustments affect the corresponding channel and power estimates. The multiplier block 335 may scale the error value $e_k$, based on a scale factor kp, to generate an scaled error approximately equal to $kpe_k$. The summing block 334 may generate a second sum comprising the sum and a time delayed output from the switch 337. The output of the switch 337 may be approximately equal to either a previously generated second sum, or the value 0 based on a value of the rst_cntrl input. The summing block 333 may generate a third sum comprising the scaled sum and the second sum. The threshold block 338 may compare a magnitude of the value of the third sum with a threshold value. A time adjustment signal $\Delta T_k$ may be generated by the threshold block 338. The final output $\Delta T_k$ may be output to the timing control block 304 which may be integrated to generate a timing estimate. A timing correction may be positive, negative, or 0. The timing control operation may integrate the output. If the value of the third sum does not exceed the threshold value, $\Delta T_k$ may be equal to 0.

Figure 3D:
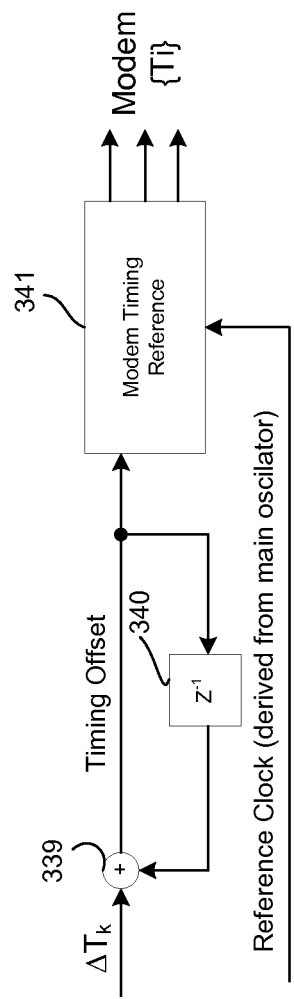
FIG. 3d is a block diagram of an exemplary timing control operation, in accordance with an embodiment of the invention.

FIG. 3d is a block diagram of an exemplary timing control operation, in accordance with an embodiment of the invention. With reference to FIG. 3d there is shown a summing block 339, a delay block 340, and a modem timing reference block 341. The summing block 339 is as described for the plurality of summing blocks 332,333,334. The delay block 336 is as described for the plurality of delay blocks 329, 330, . . . , 331. The modem timing reference block 341 may comprise suitable circuitry, logic and/or code to generate a timing reference signal.

In operation, the timing reference may be utilized in a mobile receiver. The timing control operation may comprise integrating a timing correction signal $\Delta T_k$ received from the cluster tracker operation, as described in FIG. 3c, based on the loop formed by the summing block 339 and the delay block 340. The modem timing reference block 341 may also utilize a reference clock that is derived from a main oscillator.

Figure 4:
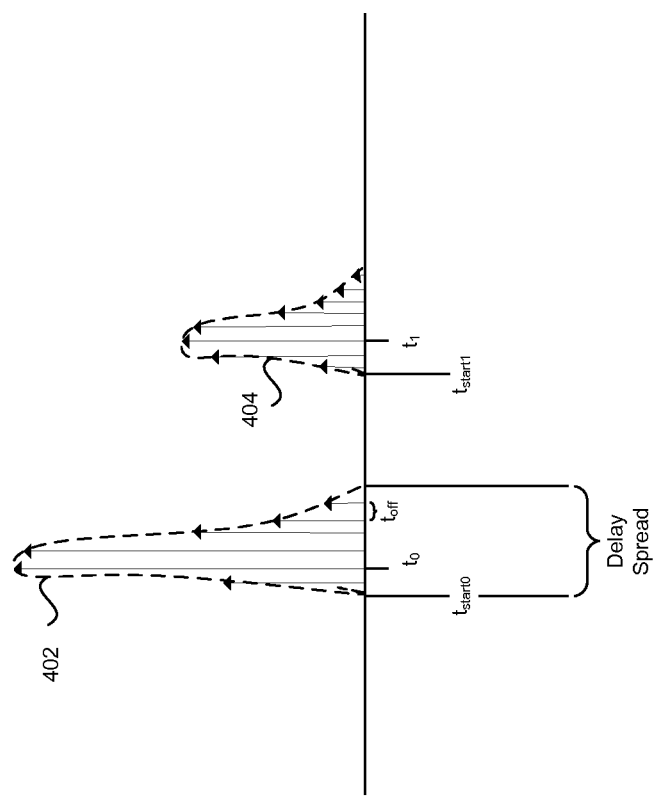
FIG. 4 is an exemplary diagram illustrating various aspects of signal clusters, in connection with an embodiment of the invention.

FIG. 4 is an exemplary diagram illustrating various aspects of signal clusters, in connection with an embodiment of the invention. Referring to FIG. 4, there is shown a timing diagram of two signal clusters 402, and 404, each comprising a plurality of individual distinct path signals. The signal cluster 402 may arrive at a mobile receiver at a time instant $t_{start0}$. The time $t_{start0}$ may correspond to a time of arrival for a first individual distinct path signal in the signal cluster 402. Within the signal cluster 402, a plurality of individual distinct path signals associated with the signal cluster 402, may arrive within a time duration, comprising a delay spread, subsequent to the time instant $t_{start0}$. The first moment time associated with the signal cluster 402 may correspond to a time instant $t_0$. A time offset between arrival of an $n^{th}$ individual distinct path signal, and an $(n+1)^{th}$ individual distinct path signal may correspond to a time offset $t_{off}$.

The signal cluster 404 may arrive at a mobile receiver at a time instant $t_{start1}$. The time $t_{start1}$ may correspond to a time of arrival for a first individual distinct path signal in the signal cluster 404. Within the signal cluster 404, a plurality of individual distinct path signals associated with the signal cluster 404, may arrive within a time duration, comprising a delay spread, subsequent to the time instant $t_{start1}$. The first moment time associated with the signal cluster 404 may correspond to a time instant $t_1$. A time offset between arrival of an $n^{th}$ individual distinct path signal, and an $(n+1)^{th}$ individual distinct path signal may correspond to a time offset $t_{off}$ as indicated for the signal cluster 402.

The signal clusters 402, 404 may have been transmitted by distinct transmitting antennas, which may have been located at distinct base transceiver stations 102, for example. When compared to signal 402, the signal 404 may have experienced a longer path to arrive at a receiving antenna 202 in a mobile receiver 104. The signal clusters 402, 404, may be individually processed by the cluster path processors, 300 and 350 respectively, in FIG. 3a, for example.

In an illustrative embodiment of the invention, the cluster path processors 300 and 350 may be utilized when receiving multipath signals from a BTS that transmits signals from 2 antennas. This mode of operation may be referred to as space time transmit diversity (STTD), which may support receiving modes closed loop 1 (CL1), and closed loop 2 (CL2) as defined by the W-CDMA standard. Alternatively, in a mode of operation, which may be referred to as "macro" diversity, the cluster path processors 300 and 350 may receive multipath signals from separate BTS, each of which may transmit multipath signals from a single antenna.

Figure 5A:
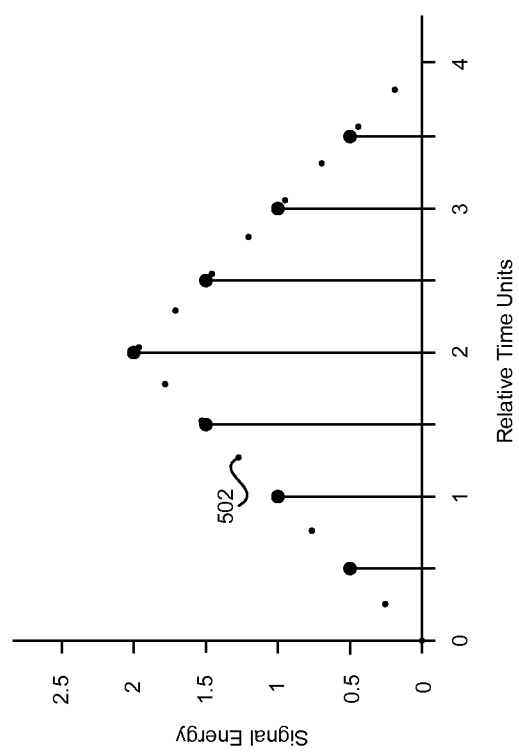
FIG. 5a is a graph that illustrates exemplary cluster moment calculations for a fully acquired signal cluster, in accordance with an embodiment of the invention.

FIG. 5a is a graph that illustrates exemplary cluster moment calculations for a fully acquired signal cluster, in accordance with an embodiment of the invention. With reference to FIG. 5a there is shown an exemplary received signal cluster 502. The profile of the signal cluster 502 shows signal energy, E(k), as a function of relative time where relative time may be measured in relation to an expected arrival time of a signal cluster at a mobile receiver. A BTS may transmit a plurality of signal clusters to a mobile receiver where the time between a start of transmission of an $n^{th}$ signal cluster, and a start of transmission of an $(n+1)^{th}$ signal cluster may be defined, in transmission time, as $\Delta$. Relative time may be measured within a $\Delta$ time interval. A delay spread associated with the signal cluster is shown to be approximately 4 relative time units. The time offset is shown to be approximately 0.5 relative time units. In the exemplary signal energy profile of FIG. 5a, the corresponding first moment time, $T_{fm}$, is approximately 2 relative time units. The corresponding first moment offset, m=4. The start time, $t_{start}$, associated with the received signal cluster may be 0 relative time units. The grid may comprise 9 grid elements, thus L=9 in this example. The time instants T(n) corresponding to each of the grid elements may be represented as follows:

$$T(n) \cong \frac{n-1}{2} \qquad \text{equation [12]}$$

where n may be a counting number comprising a range of values from 1 to 9 inclusive, for example. The value T(n) may represent a relative time, that is associated with the $n^{th}$ grid element, within the delay span of a received signal cluster.

As shown in FIG. 5a, the entire signal cluster 502 may lie within a temporal region of observation of the cluster path processor grid. The received signal cluster may, therefore, be considered as being "fully acquired". The characteristics of the received signal cluster may be:

$$E(k) \cong k \text{ (for } 0 \leq k \leq 2) \qquad \text{equation[13a]}$$

$$E(k) \cong 4-k \text{ (for } 2 \leq k \leq 4) \qquad \text{equation[13b]}$$

where k represents time instants, measured in relative time units, at which individual distinct path signals may be received where k may comprise an approximate range of values comprising (0, ½, 1, 1½, 2, 2½, 3, 3½, 4). E(k) may represent a received signal energy level measured at a time instant k.

The cluster moment generator 312 may compute corresponding aggregate power levels:

$$\text{Pwr\_E}_k \cong \sum_{k=0}^{1.5} k^2 \qquad \text{equation [14a]}$$
$$\cong 0.25 + 1 + 2.25 = 3.5$$

$$\text{Pwr\_L}_k \cong \sum_{k=2.5}^{4} (4-k)^2 \qquad \text{equation [14b]}$$
$$\cong 2.25 + 1 + 0.25 = 3.5$$

The cluster tracker may compute an error term:

$$\text{Error}_k \cong \sum_{k=0}^{1.5} k^2 - \sum_{k=2.5}^{4} (4-k)^2 \qquad \text{equation [15]}$$
$$\cong 3.5 - 3.5$$
$$\cong 0$$

In the example of FIG. 5a, the grid may be time aligned with the received signal cluster. Correspondingly there may be no timing adjustment applied to the first moment time $T_{fm}$.

Figure 5B:
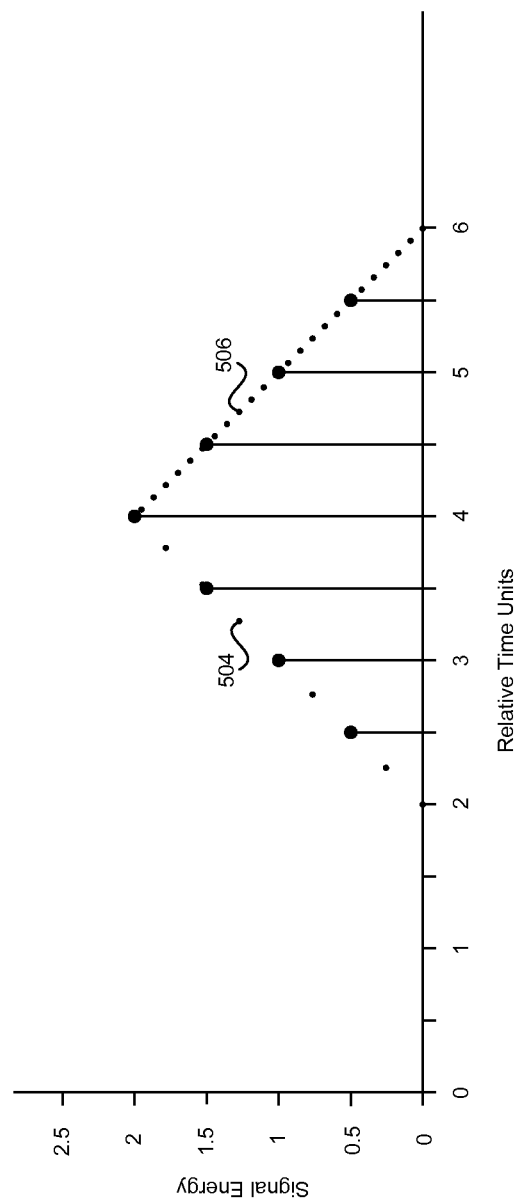
FIG. 5b is a graph that illustrates exemplary cluster moment calculations for a partially acquired signal cluster, in accordance with an embodiment of the invention.

FIG. 5b is a graph that illustrates exemplary cluster moment calculations for a partially acquired signal cluster, in accordance with an embodiment of the invention. With reference to FIG. 5b there is shown an acquired portion of a transmitted signal cluster 504, and a non-acquired portion of a transmitted signal cluster 506. The received signal cluster shown in FIG. 5a may have been received by a mobile terminal, but due to a change in the position of the mobile terminal relative to the transmitter, the profile of the acquired portion of signal cluster may have changed as shown in FIG. 5b. Because of the relative time shift in the arrival, at the mobile receiver, of the received signal cluster, the cluster path processor grid may capture only a portion of the signal energy, E(k), in the transmitted signal cluster, comprising 504 and 506. A non-acquired portion of the transmitted signal cluster, 506, may lie outside of the region of signal acquisition. Thus, in FIG. 5b the characteristics of the acquired signal cluster 504 may be:

$$E(k) \cong 0 \text{ (for } 0 \leq k \leq 2) \qquad \text{equation[16a]}$$

$$E(k) \cong k-2 \text{ (for } 2 \leq k \leq 4) \qquad \text{equation[16b]}$$

The cluster moment generator 312 may compute corresponding aggregate power levels:

$$\text{Pwr\_E}_k \cong 0 \qquad \text{equation [17a]}$$

$$\text{Pwr\_L}_k \cong \sum_{k=2.5}^{4} (k-2)^2 \qquad \text{equation [17b]}$$
$$\cong 0.25 + 1 + 2.25 + 4 = 7.5$$

The cluster tracker may compute an error term:

$$\text{Error}_k \cong 0 - \sum_{k=2.5}^{4} (k-2)^2 \qquad \text{equation [18]}$$
$$\cong 0 - 7.5$$
$$\cong -7.5$$

In the example of FIG. 5b, the grid may not be time aligned with the received signal cluster. A timing adjustment may be applied correspondingly to the first moment time $T_{fm}$.

Figure 6:
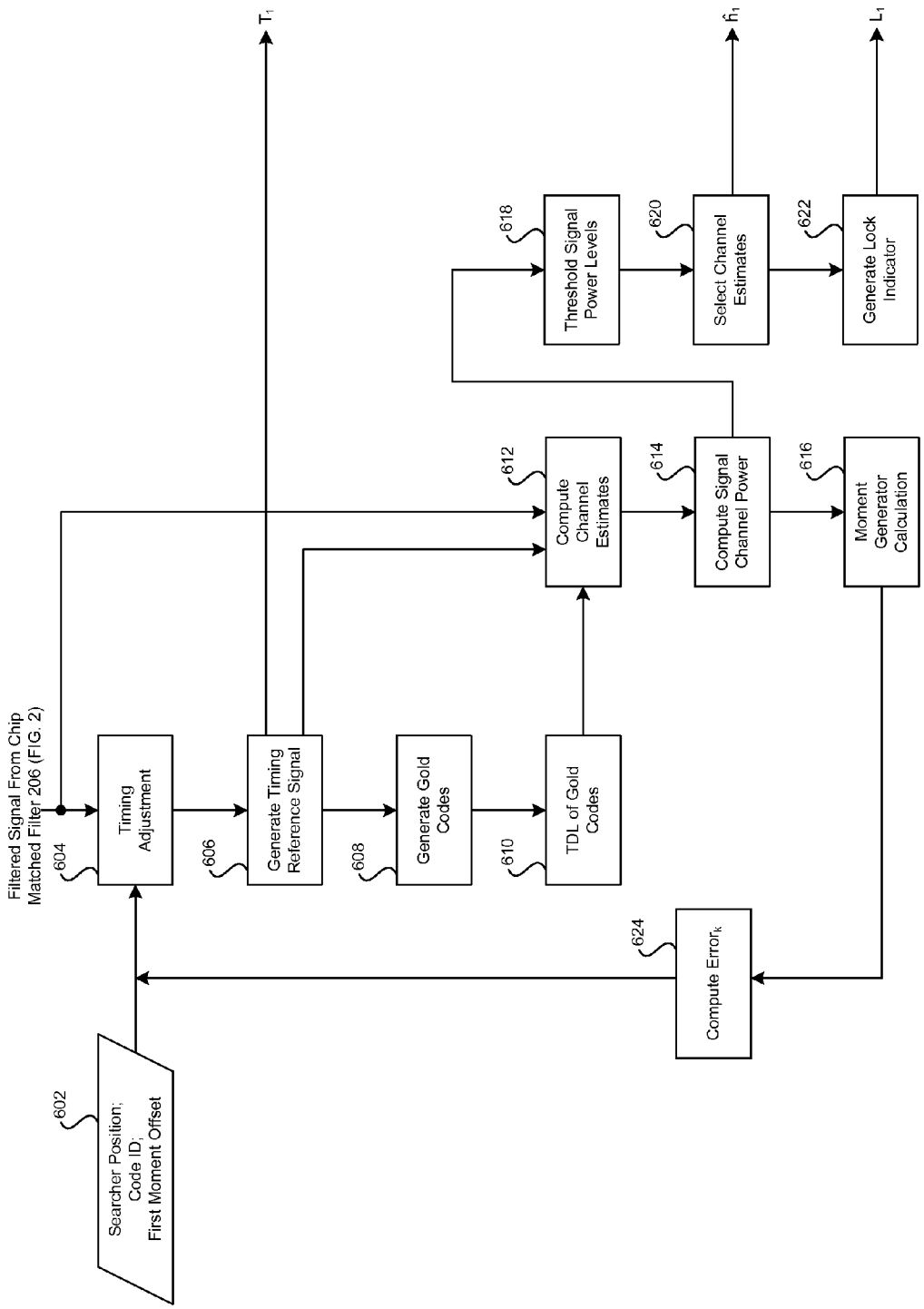
FIG. 6 is an exemplary flow diagram illustrating cluster path processing of a received signal cluster, in accordance with an embodiment of the invention.

FIG. 6 is an exemplary flow diagram illustrating cluster path processing of a received signal cluster, in accordance with an embodiment of the invention. With reference to FIG. 6 step 602 described inputs utilized by the CPP 300 comprising a searcher position, code ID, and first moment offset. In step 604 a timing adjustment may be computed based on a received filtered signal from the chip matched filter 206, a generated code, and computed signal cluster energy levels. In step 606 a timing reference signal may be generated based upon the timing adjustment signal generated in step 604. The timing reference signal may be output from the cluster path processor as output signal $T_1$. In step 608 a Gold code may be generated at a time instant in accordance with the timing reference signal generated in step 606. In step 610, the Gold code may be regenerated at distinct time instants within a duration of a delay spread. In step 612, channel estimates may be generated based on the received filtered signal from the chip matched filter 206, timing reference signal generated in step 606, and Gold codes generated in step 610. In step 614 channel estimates computed in step 612 may be utilized to compute signal channel power. In step 616 the channel power, computed in step 614, may be utilized to compute aggregate signal power levels, $Pwr\_E_k$ and $Pwr\_L_k$, for at least a portion of the received signal cluster. In step 624, an error term, $error_k$, may be computed based on the aggregate signal power levels computed in step 616.

In step 618, the channel power computations from step 614 may be thresholded. In step 620, channel estimates computed in step 612 may be selected based on the results of the thresholding of step 618. The selected channel estimates may be output from the cluster path processor as output signal F. In step 622 corresponding lock indicators may be generated that indicate the channel estimates selected in step 620. The lock indicators may be output from the cluster path processor as output signal $L_1$.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form. -

What is claimed is:

1. A method for processing radio frequency (RF) signals, the method comprising:
    performing by one or more processors and/or circuits:
        detecting a maximum signal energy level among a plurality of individual distinct path signals in a wirelessly received signal cluster;
        computing an early aggregate power level associated with at least a portion of said plurality of individual distinct path signals received at time instants preceding a first moment time, and a late aggregate power level associated with at least a portion of said plurality of individual distinct path signals received at time instants subsequent to said first moment time, wherein said first moment time corresponds to a time said detected maximum signal energy level is detected;
    adjusting said first moment time based on said early aggregate power level and said late aggregate power level; and
    recovering at least a portion of said plurality of individual distinct path signals at a corresponding plurality of time instants based on said adjusted first moment time wherein said at least a portion of said plurality of individual distinct path signals is received within a duration comprising a delay spread of said wirelessly received signal cluster.

2. The method according to claim 1, comprising:
computing at least one timing adjustment signal based on one or more of:
    said at least a portion of said plurality of individual distinct path signals, a generated code, and at least one computed aggregate power level.

3. The method according to claim 2, comprising:
computing a timing reference signal based on said timing adjustment signal.

4. The method according to claim 1, comprising:
generating a code based on one or more of:
    a start time associated with said wirelessly received signal cluster, a code identification, and a timing reference signal.

5. The method according to claim 4, comprising:
computing a plurality of channel estimates based on one or more of:
    said at least a portion of said plurality of individual distinct path signals, said timing reference signal, and at least one said generated code.

6. The method according to claim 5, comprising:
computing a plurality of power levels corresponding to said plurality of channel estimates.

7. The method according to claim 6, comprising:
computing said early aggregate power level based on a summation of said plurality of power levels corresponding to said at least a portion of said plurality of individual distinct path signals received at time instants preceding said first moment time.

8. The method according to claim 6, comprising:
computing said late aggregate power level based on a summation of said plurality of power levels corresponding to said at least a portion of said plurality of individual distinct path signals received at time instants subsequent to said first moment time.

9. The method according to claim 6, comprising:
determining relative time instants, in relation to an expected arrival time of said wirelessly received signal cluster, corresponding to said at least a portion of said plurality of individual distinct path signals received at time instants preceding said first moment time and at time instants subsequent to said first moment time, respectively.

10. The method according to claim 9, comprising:
computing said early aggregate power level and said late aggregate power level utilizing said corresponding relative time instants, respectively.

11. A system for processing radio frequency (RF) signals, the system comprising:
one or more circuits for use in a receiver configured to:
detect a maximum signal energy level among a plurality of individual distinct path signals in a wirelessly received signal cluster;
compute an early aggregate power level associated with at least a portion of said plurality of individual distinct path signals received at time instants preceding a first moment time, and a late aggregate power level associated with at least a portion of said plurality of individual distinct path signals received at time instants subsequent to said first moment time, wherein said first moment time corresponds to a time said detected maximum signal energy level is detected;
adjust said first moment time based on said early aggregate power level and said late aggregate power level; and
recover at least a portion of said plurality of individual distinct path signals at a corresponding plurality of time instants based on said adjusted first moment time wherein said at least a portion of said plurality of individual distinct path signals is received within a duration comprising a delay spread of said wirelessly received signal cluster.

12. The system according to claim 11, wherein said one or more circuits are further configured to compute at least one timing adjustment signal based on one or more of: said at least a portion of said plurality of individual distinct path signals, a generated code, and at least one computed aggregate power level.

13. The system according to claim 12, wherein said one or more circuits are further configured to compute a timing reference signal based on said timing adjustment signal.

14. The system according to claim 11, wherein said one or more circuits are further configured to generate a code based on one or more of: a start time associated with said wirelessly received signal cluster, a code identification, and a timing reference signal.

15. The system according to claim 14, wherein said one or more circuits are further configured to compute a plurality of channel estimates based on one or more of: said at least a portion of said plurality of individual distinct path signals, said timing reference signal, and at least one said generated code.

16. The system according to claim 15, wherein said one or more circuits are further configured to compute a plurality of power levels corresponding to said plurality of channel estimates.

17. The system according to claim 16, wherein said one or more circuits are further configured to compute said early aggregate power level based on a summation of at least a portion of said plurality of power levels corresponding to said at least a portion of said plurality of individual distinct path signals received at time instants preceding said first moment time.

18. The system according to claim 16, wherein said one or more circuits are further configured to compute said late aggregate power level based on a summation of said plurality of power levels corresponding to said at least a portion of said plurality of individual distinct path signals received at time instants subsequent to said first moment time.

19. The system according to claim 16, wherein said one or more circuits are further configured to determine relative time instants, in relation to an expected arrival time of said wirelessly received signal cluster, corresponding to said at least a portion of said plurality of individual distinct path signals received at time instants preceding said first moment time and at time instants subsequent to said first moment time, respectively.

20. The system according to claim 16, wherein said one or more circuits are further configured to compute said early aggregate power level and said late aggregate power level utilizing said corresponding relative time instants, respectively.

* * * * *

UNITED STATES PATENT AND TRADEMARK OFFICE
CERTIFICATE OF CORRECTION

| | | |
|---|---|---|
| PATENT NO. | : 8,503,509 B2 | Page 1 of 1 |
| APPLICATION NO. | : 13/185297 | |
| DATED | : August 6, 2013 | |
| INVENTOR(S) | : Mark Kent et al. | |

It is certified that error appears in the above-identified patent and that said Letters Patent is hereby corrected as shown below:

On the Title Page, Item (*) Notice

"(*) Notice: Subject to any disclaimer, the term of this patent is extended or adjusted under 35 U.S.C. 154(b) by 0 days." should read -- (*) Notice: Subject to any disclaimer, the term of this patent is extended or adjusted under 35 U.S.C. 154(b) by 0 days. This patent is subject to a terminal disclaimer. --

Signed and Sealed this
Fifth Day of November, 2013

Teresa Stanek Rea
*Deputy Director of the United States Patent and Trademark Office*